(12) United States Patent
Lesiecki et al.

(10) Patent No.: US 9,058,380 B2
(45) Date of Patent: Jun. 16, 2015

(54) METHODS AND SYSTEMS FOR LIST FILTERING BASED ON KNOWN ENTITY MATCHING

(71) Applicant: FIS Financial Compliance Solutions, LLC, Jacksonville, FL (US)

(72) Inventors: Greg Lesiecki, Greendale, WI (US); Tyler Rudkin, Fox Point, WI (US)

(73) Assignee: FIS FINANCIAL COMPLIANCE SOLUTIONS, LLC, Jacksonville, FL (US)

( * ) Notice: Subject to any disclaimer, the term of this patent is extended or adjusted under 35 U.S.C. 154(b) by 135 days.

(21) Appl. No.: 13/759,977

(22) Filed: Feb. 5, 2013

(65) Prior Publication Data

US 2013/0204880 A1    Aug. 8, 2013

Related U.S. Application Data

(60) Provisional application No. 61/595,579, filed on Feb. 6, 2012.

(51) Int. Cl.
*G06F 7/00* (2006.01)
*G06F 17/30* (2006.01)

(52) U.S. Cl.
CPC .... *G06F 17/30699* (2013.01); *G06F 17/30542* (2013.01)

(58) Field of Classification Search
CPC .............. G06F 17/30; G06F 17/30864; G06F 17/30867; G06F 17/3053; G06Q 30/02
See application file for complete search history.

(56) References Cited

U.S. PATENT DOCUMENTS

| | | | |
|---|---|---|---|
| 6,611,842 B1 * | 8/2003 | Brown | 1/1 |
| 6,625,595 B1 * | 9/2003 | Anderson et al. | 1/1 |
| 6,636,853 B1 * | 10/2003 | Stephens, Jr. | 1/1 |
| 7,363,308 B2 | 4/2008 | Dillon et al. | |
| 7,685,093 B1 * | 3/2010 | Adams et al. | 707/999.001 |
| 7,822,762 B2 | 10/2010 | Payne et al. | |
| 7,912,842 B1 * | 3/2011 | Bayliss | 707/749 |

(Continued)

OTHER PUBLICATIONS

"Penley, an eFunds Subsidiary, and IntegraSys, Unit of Fiserv Team, to Sell Identity Fraud Prevention Program," Press Release, Dec. 2004. <http://www.bloomberglaw.com/ms/document/I8EKON3PWT1E>.

(Continued)

*Primary Examiner* — Robert Beausoliel, Jr.
*Assistant Examiner* — Nicholas Allen
(74) *Attorney, Agent, or Firm* — Finnegan, Henderson, Farabow, Garrett & Dunner LLP

(57) ABSTRACT

Methods and systems are disclosed for implementing data matching techniques. In some embodiments, methods and systems may be implemented for filtering a received record associated with at least one record attribute against an entity record. The methods and systems comprise, for example, applying a record attribute weight to the at least one record attribute associated with the received record, performing at least one matching technique that compares the at least one record attribute of the received record against the entity record, wherein the at least one matching technique is associated with a corresponding matching technique multiplier, calculating a matching score based on a result of the at least one matching technique and the multiplier associated with the at least one matching technique, and comparing the matching score to a threshold to determine whether the received record represents a suspect entity.

20 Claims, 8 Drawing Sheets

(56) References Cited

U.S. PATENT DOCUMENTS

| | | |
|---|---|---|
| 8,046,362 B2 | 10/2011 | Bayliss |
| 2002/0152224 A1* | 10/2002 | Roth et al. .................. 707/104.1 |
| 2007/0274519 A1* | 11/2007 | Cohen et al. .................. 380/201 |
| 2009/0187553 A1* | 7/2009 | Sarkar et al. ...................... 707/5 |
| 2012/0023107 A1* | 1/2012 | Nachnani et al. ............. 707/748 |

OTHER PUBLICATIONS

Internaional Search Report and Written Opinion of the International Searching Authority, for corresponding PCT Application No. PCT/US13/24899, mailed Apr. 16, 2013 (8 pages).

* cited by examiner

400

| | Technique | Multiplier | |
|---|---|---|---|
| 401A | Exact String Filter | 1.00 | 403A |
| 401B | Preprocessed Name Filter | 0.95 | 403B |
| 401C | Preprocessed Name, Vowels Changed to Zeros Filter | 0.90 | 403C |
| 401D | Preprocessed Name, Vowels Removed Filter | 0.85 | 403D |
| 401E | Preprocessed Name, Vowels Changed to Zeros, Consonants to Soundex Filter | 0.70 | 403E |
| 401F | Partial Names Filter | 0.65 | 403F |
| 401G | Commonly Misspelled Words Filter | 0.60 | 403G |

| | 521 | 523 | 525 | 527 | 529 | 531 | 533 | 535 | 537 | 539 | 541 | 543 | 545 |
|---|---|---|---|---|---|---|---|---|---|---|---|---|---|
| | ID | String 1 | Pre-processed String 1 | Weight | Part Identification | String 2 | Pre-processed String 2 | Weight | Part Identification | String 3 | Pre-processed String 3 | Weight 2 | Part Identification |
| 551 | 1234 | Muhammad | Muhamad | .50 | FirstName | Jaffar | Jafar | .25 | LastName-1 | Ali | Ali | .25 | LastName-2 |
| 552 | 2345 | Dennis | Denis | .50 | FirstName | Smith | Smith | .50 | LastName | --- | --- | --- | --- |
| 553 | 3456 | Timothy | Timothy | .25 | FirstName-1 | John | John | .25 | FirstName-2 | Addams | Adams | .50 | LastName |
| 554 | 4567 | Johnson & Smith, Inc. | Johnson Smith Inc | 1.00 | CompanyName | --- | --- | --- | --- | --- | --- | --- | --- |

METHODS AND SYSTEMS FOR LIST FILTERING BASED ON KNOWN ENTITY MATCHING

PRIORITY CLAIM

The present application claims priority to U.S. Provisional Patent Application 61/595,579, filed Feb. 6, 2012, the disclosure of which is hereby incorporated by reference in its entirety.

TECHNICAL FIELD

The present disclosure generally relates to methods and systems for filtering records based on known entity matching. In certain embodiments, received records may be matched against a list of entity records using attributes of the received and entity records and matching techniques applied with configurable weights.

BACKGROUND

As the volume of electronic personal data stored in databases increases, many companies and organizations today have list filtering systems in place to manage and filter the data.

List filtering systems match a database or record against known content. Conventional list filtering systems do not take into account specific attributes of a known entity to be matched against, and they provide the same filtering results regardless of the end-user or client. However, companies and organizations across different industries and market segments may have different list filtering needs. Depending on numerous variables, the lists checked and the required degree of match may vary for each company or organization. For example, information that may be relevant for a bank in Omaha, Nebr., may not be relevant for another bank in San Diego, Calif. Further, requirements for the San Diego bank may be different from other corporations located in San Diego. Likewise, the list filtering needs for a commercial bank may not be the same as those for a health care insurer/payer. Furthermore, information relating to an account origination application may not be the same as that for an ACH transaction.

As such, there is a need to provide effective list filtering systems that may be customized to each company/organization based on industry, individual entity risk, geographical location, or the like

SUMMARY OF THE INVENTION

Disclosed embodiments include exemplary methods and systems for list filtering based on known entity matching, where a record is matched against a list of entity records using attributes and a plurality of matching techniques applied with configurable weights.

The disclosed embodiments include a method for filtering a received record associated with at least one record attribute against an entity record. In one embodiment, the method may comprise applying a record attribute weight to at least one record attribute associated with a received record and performing a matching technique associated with a corresponding technique multiplier by comparing the received record to a stored entity record. The method may also include calculating a matching score based on a result of the matching technique and associated multiplier. In further embodiments, the method may include comparing the matching score to a threshold to determine whether the received record represents a suspect entity.

The disclosed embodiments also include a system for filtering a received record associated with at least one record attribute against an entity record. The system may include a memory including software instructions and one or more processors configured to execute the software instructions to apply a record attribute weight to at least one record attribute associated with a received record. The one or more processors may be further configured to perform a matching technique associated with a corresponding technique multiplier by comparing the received record to a stored entity record and to calculate a matching score based on a result of the matching technique and associated multiplier. The one or more processors may also be configured to compare the matching score to a threshold to determine whether the received record represents a suspect entity.

The disclosed embodiments may also include a list filtering system configured to provide filtering for exact matching and produce results that are pertinent to the needs of individual companies and/or organizations. Furthermore, a list filtering system consistent with disclosed embodiments may allow an individual company/organization to customize or modify the system to increase coverage when appropriate, so as to report all possible matches and may be able to yield matches with high confidence levels without missing any possible relevant matches. In addition, a list filtering system consistent with disclosed embodiments may deliver alerts and flags that warrant further checking or investigation by the individual company/organization, by a government organization, or by another entity.

BRIEF DESCRIPTION OF THE DRAWINGS

FIG. 4 is an exemplary tiered methodology 400, usable for filtering incoming records and matching against known entities, consistent with disclosed embodiments.

FIG. 5 is an exemplary set of records 500, for use in explaining exemplary operations, functions, structures, and features of exemplary embodiments of this disclosure.

DESCRIPTION OF THE EMBODIMENTS

Figure 1:
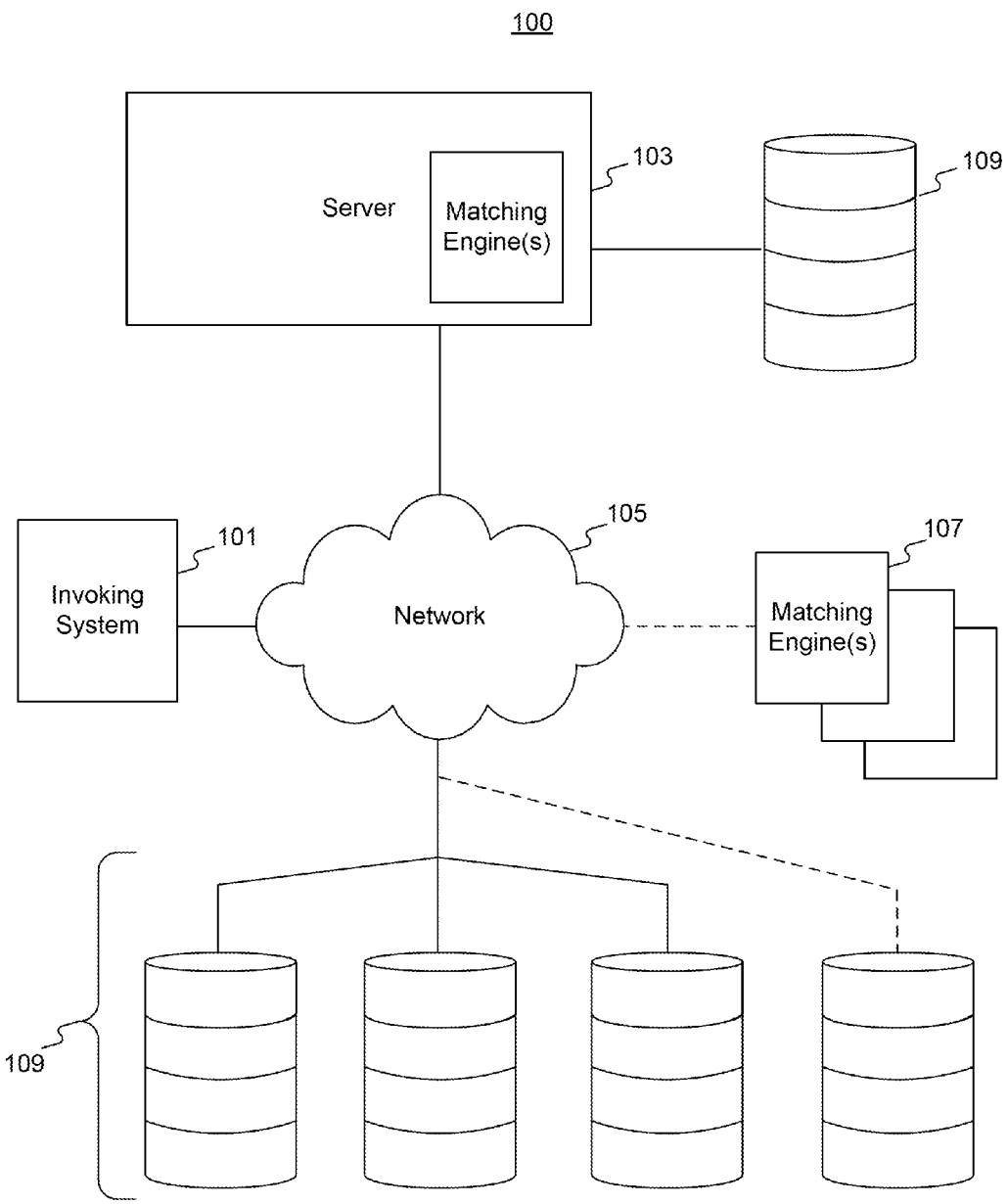
FIG. 1 is an exemplary network layout 100, consistent with disclosed embodiments.

Reference will now be made in detail to some exemplary embodiments of the invention, examples of which are illustrated in the accompanying drawings. Wherever possible, the same reference numbers will be used throughout the drawings and disclosure to refer to the same or like parts.

The disclosed embodiments provide methods and systems for list filtering. In one embodiment, list filtering enables transactions to be monitored and flagged for a variety of reasons. For example, if a participant in a financial transaction is known to have committed fraud in the past, a watch list filter system consistent with disclosed embodiments may flag the transaction as potentially fraudulent. As another example, if a participant in a financial transaction is known or suspected to be involved with a terrorist group, narcotic group, or is otherwise on a list of individuals known to be involved in illegal acts, a watch list filter system consistent with disclosed embodiments may flag the transaction in order to stop or pause it and/or alert appropriate parties (such as a government agency). In certain embodiments, a list may include, for an example, a watch list, a list of sanctioned or embargoed entities such as an OFAC (Office of Foreign Assets Control) list, RFC (Risk, Fraud & Compliance) lists, or the like. In some embodiments, lists can contain up-to-date information and known "good" data such as data obtained from a reputable source (e.g. a government authority such as the U.S. Treasury).

Entries on such lists, in some embodiments, are organized into "entities" or "entity records." A known entity or corpus of known entities may include persons, businesses, companies, corporations, organizations, unions, associations, countries, etc. Attributes of the known entity or corpus of known entities may include names, addresses, date of births, social security numbers, passport numbers, driver's license numbers, business registration information, business functions, geographical locations, name origins, or the like. In certain embodiments, both the corpus of known entities and the list of attributes may be extensible, and are not limited to the above examples. As described in some exemplary embodiments of this disclosure, the data on the known entities or corpus of known entities may be matched against participants in a transaction to determine whether there are restrictions or known history with a participant, and to take appropriate action.

Each field of data representing an entity may, in some embodiments, be divided into "attributes." Attributes may further be divided into "sub-attributes" that may represent different portions of the attributes. The disclosed embodiments may divide data elements representing these entities in a number of ways consistent with that understood by one of ordinary skill in the art.

For example, an entity with the name John-Paul Smith, living at 123 North Glen Road, Anytown, N.J., 07046, USA may include two attributes: a "name" attribute and an "address" attribute. The name attribute for this entity may correspond to "John-Paul Smith," and the address attribute may correspond to "123 North Glen Road, Anytown, N.J., 07046, USA."

The disclosed embodiments may be configured to further divide the name attribute into sub-attributes corresponding to a first name and a last name. For example, in this case, the first name sub-attribute may be "John-Paul," and the last name sub-attribute may be "Smith." Similarly, disclosed embodiments may further divide the address attribute into sub-attributes to enable better matching. For example, the address attribute could be divided into attributes including street number ("123"), street name ("North Glen Road"), town name ("Anytown"), state name ("NJ" or "New Jersey"), zip code ("07046"), and country ("USA"). The disclosed embodiments may be configured to further divide the sub-attributes. For example, the first name sub-attribute in the above example may be divided into further sub-attributes corresponding to "John" and "Paul."

Throughout this disclosure, reference may be made to "components" as comprising the smallest element of an attribute consistent with the disclosed embodiments. For example, if the name "John Smith" is divisible into two portions ("John" and "Smith"), this disclosure may refer to "John Smith" as an attribute, and refer to both of "John" and "Smith" as "components" or "sub-attributes."

Other arrangements of attributes and sub-attributes are possible with the disclosed embodiments, as will be understood by one of ordinary skill in the art. As one example, exemplary embodiments can further divide street names into smaller sub-attributes. Thus, in the above example, the disclosed embodiments may further divide "North Glen Road" into "North," "Glen," and "Road," or direction, street name, and street designation sub-attributes, respectively.

Certain exemplary embodiments may be configured to perform filtering and matching in a real-time or batch mode. Additionally, while some embodiments of this disclosure reference financial transactions, the disclosed embodiments may be applicable to other types of transactions. For example, disclosed embodiments can be applied to use cases for insurance companies, financial institutions, healthcare organizations, government entities, or any other situation where determining matches between two pieces of data can be helpful in accomplishing business or mission goals.

FIG. 1 is an exemplary network layout 100, consistent with disclosed embodiments. In one aspect, network layout 100 may include invoking system 101, server 103, network 105, matching engine(s) 107, and database(s) 109.

Invoking system 101 may be, for example, one or more computing devices configured to perform one or more operations consistent with the disclosed embodiments. For example, invoking system 101 may be a personal computer, laptop, mobile device (e.g., tablet, smart phone), server, or other device, configured for an entity to use disclosed embodiments to match and filter participant data against known entity data, and for accessing systems and performing or participating in one or more methods consistent with the disclosed embodiments. In one embodiment, invoking system 101 may be a point-of-sale (POS) device (e.g., a cash register), a web server configured to perform online finance transactions including, for example, online checkout processes, a bank server configured to perform or facilitate payment transactions, transfers, or other financial actions, a device configured to match and filter participant data against known entity data, an insurance company server to determine matches between claimants and records, a healthcare company server to determine matches between claimants and records, or the like. Invoking system 101 may be any device configured to access the disclosed systems and methods. Invoking system 101 may include known computing components, such as one or more processors, one or more memory devices storing software instructions executed by the processor(s) and data.

In certain embodiments, a user may operate invoking system 101 to perform one or more operations consistent with disclosed embodiments. For example, a user may be a customer of an entity that provides services associated with one or more operations performed by the disclosed embodiments. For example, the user may be a customer of an entity (e.g., a company, an organization, an individual, etc.) that provides one or more of server 103, matching engines 107 and/or database(s) 109 to perform operations for monitoring transactions consistent with certain disclosed embodiments. In certain embodiments, the user of invoking system 101 may be associated with an entity that provides services associated with transactions, such as financial transactions. For instance, the user of invoking system 101 may be an employee or otherwise associated with a financial service provider that is required to comply with governmental regulations concerning sanctioned parties. For example, the United States government prohibits transactions with certain individuals, countries, companies, or other entities, through the Office of Foreign Assets Control (OFAC). If a participant in a transaction is present on a list of prohibited participants, various federal laws may prevent transactions with that participant. Thus, user(s) associated with financial service providers, such as banks, may operate invoking system 101 to perform one or more of the disclosed embodiments to determine whether a participant in a transaction is on a "prohibited" list. In some embodiments, the list may be a list of entities (e.g., people, company names, organizations, etc.) whose transactions should be watched based on their status, title, position, or any other reason. For example, the disclosed embodiments may store a list of information on individuals that are politically or financially exposed or notable (such as political appointees, politicians, celebrities, etc.) in order to monitor transactions using their name, which may be performed without their authorization.

In some embodiments, the list may be a list of entities that may be associated with particular accounts (e.g., financial, service-based, etc.), events, companies (e.g., customers of a company), etc. Certain embodiments may use such lists of entities to verify or authorize transactions or related operations (e.g., where a match does not indicate a prohibition). For example, a healthcare or insurance company may attempt to match an insurance claim against records of insured individuals, in order to verify that a claim from the individual is valid. Other institutions may also utilize disclosed embodiments to match persons for other purposes, such as marketing, fraud, compliance, due diligence, identity verification, or the like. One of ordinary skill will understand that the particularly disclosed embodiments are not limiting and can be used for a variety of purposes.

One or more users may be associated with invoking system 101. Moreover, the disclosed embodiments are not limited to any specific relationships or affiliations between the user(s) of invoking system 101 and an entity, person(s), or entities providing server 103, matching engines 107, and/or database(s) 109.

Server 103 may be one or more server computers configured to perform one or more operations consistent with disclosed embodiments. In one aspect, server 103 may be implemented as a single computer, through which invoking system 101 is able to communicate with other components of network layout 100 illustrated in FIG. 1. In some embodiments, invoking system 101 may communicate with server 103 through network 105. In other embodiments, server 103 may communicate on behalf of invoking system 101 with matching engine(s) 107 or database(s) 109 through network 105. In some embodiments, server 103 may embody the functionality of one or more of matching engine(s) 107, though in some embodiments, matching engine(s) 107 may be implemented both inside and outside of server 103 (e.g., matching engine(s) 107 may be software and/or hardware components included with server 103 or remote from server 103).

In some embodiments, invoking system 101 may be directly connected to server 103 through a separate link (not shown in FIG. 1). In certain embodiments, server 103 may be configured to operate as a front-end device configured to provide access to one or more watch lists consistent with certain disclosed embodiments. Server 103 may, in some embodiments, utilize matching engine(s) 107 to modify incoming records in order to find partial or full matches with entities identified in information stored in database(s) 109. Server 103 may include known computing components, such as one or more processors, one or more memory devices storing software instructions executed by the processor(s) and data. While FIG. 1 illustrates server 103 as a single server, in some embodiments, multiple devices may implement the functionality associated with server 103.

Network 105 may be a network that is configured to provide communication between various components of network layout 100 depicted in FIG. 1. Network 105 may be implemented, in some embodiments, as one or more networks that connect devices in network layout 100 for allowing communication between them. For example, as one of ordinary skill in the art will recognize, network 105 may be implemented as the Internet, a wireless network, a wired network, a local area network (LAN), or any other type of network that provides communications between one or more components of network layout 100.

Matching engine(s) 107 may be implemented as one or more computers storing instructions that, when executed by processor(s), perform matching technique processes for determining matches between participant data and stored entity records. In some embodiments, server 103 may be the computer upon which matching engine(s) 107 are implemented. However, in some embodiments, at least some of matching engine(s) 107 may be implemented on separate computers. For example, server 103 may connect to matching engine(s) 107 over network 105 to match incoming data records against entity records in database(s) 109, and invoking system 101 may send participant data to server 103 for matching against those entity records. In other embodiments, matching engine(s) 107 may represent software that, when executed by processor(s), perform matching technique processes. For example, server 103 may access and execute matching engine(s) to perform one or more processes consistent with the disclosed embodiments. In certain configurations, matching engine(s) 107 may be software stored in memory accessible by server 103 (e.g., in memory local to server 103 or remote memory accessible over a communication link, such as network 105). Thus, in certain aspects, matching engine(s) 107 may be implemented as one or more computers, as software stored on a memory device accessible by server 103, or a combination thereof (e.g., one matching engine 107 may be a computer executing one or more matching techniques and another matching engine 107 may be software that, when executed by server 103, performs one or more matching techniques).

Matching engine(s) 107 may be configured to perform matching techniques in different ways. For example, one of matching engine(s) 107 may store and/or execute software that performs an algorithm for determining whether a record is a phonetic match to an entity in one of database(s) 109. Another of matching engine(s) 107 may store and/or execute software that performs an algorithm for determining whether the record matches an entity by replacing vowels with zeros (0), filtering the remaining characters using a known Soundex technique, and matching the participant record to a stored entity record. The disclosed embodiments may be configured to implement matching engine(s) 107 such that a variety of algorithms may be performed for performing one or more matching techniques.

Database(s) 109 may be one or more memory devices configured to store data. Additionally, database(s) 109 may also, in some embodiments, be implemented as a computer system with a storage device, consistent with that described below in connection with FIG. 7. In one aspect, database(s) 109 may be used by components of network layout 100 to perform one or more operations consistent with the disclosed embodiments. In one embodiment, database(s) 109 may comprise storage containing a variety of data sets consistent with disclosed embodiments. For example, database(s) 109 may include, for example, lists of politically/financially notable or exposed individuals, watch lists, fraud lists, a list of sanctioned or embargoed entities such as an OFAC (Office of Foreign Assets Control) list, RFC (Risk, Fraud & Compliance) lists, or the like. In some embodiments, database(s) 109 may include one or more lists that may contain up-to-date or current information and known "good" data, such as data obtained from a reputable source (e.g. a government authority such as the U.S. Treasury). Additionally, in some embodiments, database(s) 109 may comprise data from non-governmental authorities, such as watch lists generated by a corporation or other entity. In one aspect, database(s) 109 may store data referred to herein as "entity records," "entity data," or "entity information,"

In certain embodiments, one or more database(s) 109 may be co-located with server 103, may be co-located with one another on network 105, or may be located separately from other devices (signified by the dashed line connecting one of database(s) 109). One of ordinary skill will recognize that the disclosed embodiments are not limited to the configuration and/or arrangement of database(s) 109, Any of invoking system 101, server 103, matching engine(s) 107, or database(s) 109 may, in some embodiments, be implemented as a computer system consistent with that described below in connection with FIG. 7. Additionally, while network 105 is shown in FIG. 1 as a "central" point for communications between components of system 100, the disclosed embodiments are not so limited. For example, one or more components of network layout 100 may be interconnected in a variety of ways, and may in some embodiments be directly connected to, co-located with, or remote from one another, as one of ordinary skill will appreciate. Additionally, while some disclosed embodiments may be implemented on server 103, the disclosed embodiments are not so limited. For instance, in some embodiments, other devices (such as matching engine(s) 107 and/or database(s) 109) may be configured to perform one or more of the processes and functionalities consistent with the disclosed embodiments, including embodiments described with respect to server 103.

Figure 2:
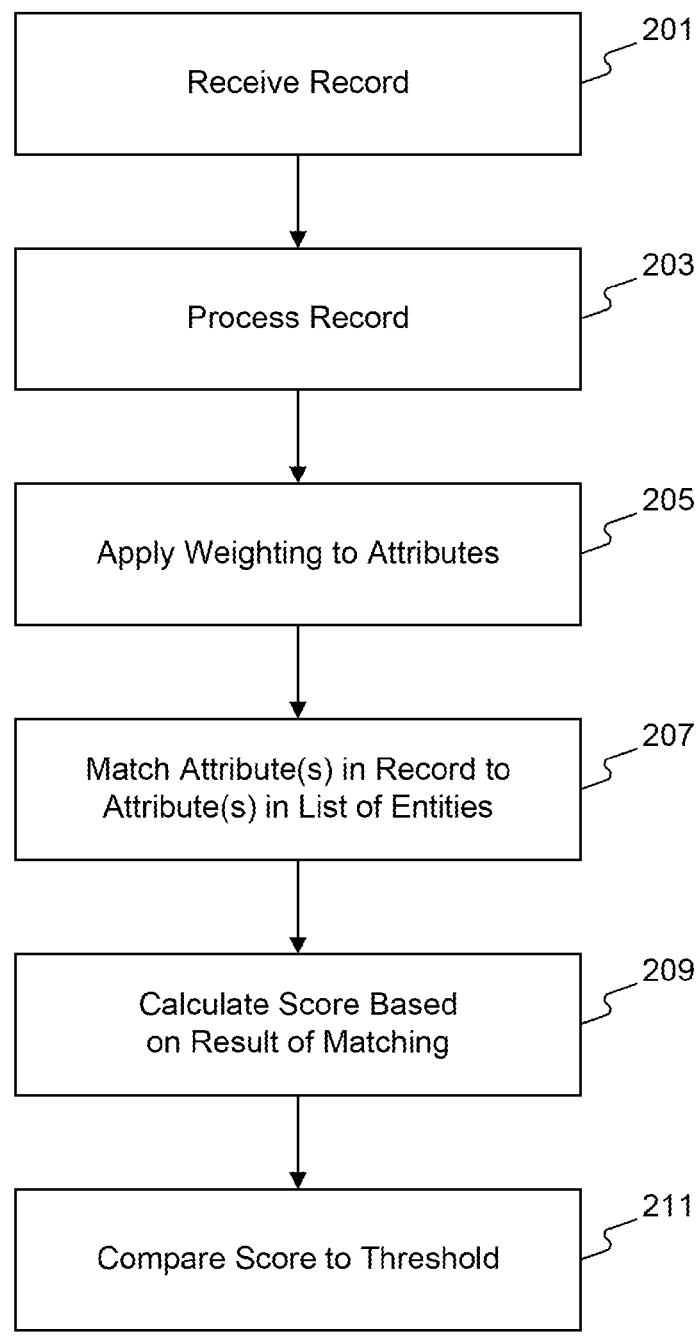
FIG. 2 is an exemplary process 200 for filtering and matching records against a list of known entities, consistent with disclosed embodiments.

As explained, the disclosed embodiments provide, in some aspects, processes for filtering and assessing records of information against lists of known information for monitoring events. FIG. 2 is an exemplary process 200 for filtering and matching records against one or more lists of known information (e.g., known entities), consistent with disclosed embodiments. The particular order and number of steps in process 200 is exemplary. The disclosed embodiments may include configurations where one or more steps of process 200 may be duplicated, reversed, performed in a different order, or omitted. Furthermore, one or more steps of process 200 may be performed by a single device or multiple devices. For example, while the steps of process 200 are explained below as performed by server 103, other devices including database(s) 109 or matching engine(s) 107 may be configured to perform one or more of the steps of process 200, or may work in connection with server 103 to perform one or more steps of process 200.

In one embodiment, process 200 may begin with a device receiving a record (e.g., step 201). In some embodiments, a server (such as server 103) may receive the record from a client terminal (such as invoking system 101). The record may be provided for purposes of processing against a watch list. The record may comprise, for example, a participant name (such as a company name, an identifier, a personal name, an address, a phone number, a date of birth, a passport number, or other data), and may be in any format. For example, certain embodiments may be implemented in connection with financial transactions (e.g., purchase transactions, financial account transactions, etc.). Such transactions may be associated with one or more participants. A participant may, for example, be a person or entity attempting to purchase an item or service, attempting to participate in a financial transaction (e.g., withdrawing funds from a financial account, transfer funds, open an account, etc.). A participant may represent the source or recipient (or intended recipient) involved in a transaction. In some embodiments, records may be received in real-time. For instance, while a financial transaction is occurring, invoking system 101 may send one or more names of one or more participants associated with the transaction to server 103 for processing in a manner consistent with the disclosed embodiments, such as for checking against one or more lists, and for pausing or denying the transaction if one or more participants is found on the list(s). In some embodiments, the device may receive a record in a batch of a large set of records, on a periodic basis (e.g., hourly, daily, weekly, or other basis), and may process the record(s) upon receipt.

In step 203, the receiving device (e.g., server 103) may process the received record. In some embodiments, the received record may be transmitted as a structured record. However, in other embodiments, the record may be transmitted as part of raw, unstructured text, with or without accompanying information, such as, for example, addresses, passport numbers, dates of birth, comments, or the like. Server 103 may thus, in step 203, process the data included in the received record to determine appropriate data for matching. For example, server 103 may be configured to determine one or more of proper names, physical addresses, name parts, business names, abbreviations, noise words, or the like, from the received record.

Noise words, in some embodiments, may represent common words that could erroneously contribute to the likelihood that a received record matches a stored entity record. For example, if a government entity is monitoring a transaction between two banks (e.g., the "First Bank of Maine" and "Second Financial Bank"), every instance of the word "Bank" in a stored entity record could potentially be found to match these entities, even though the only similarity between the bank names and the stored records is the word "Bank." After certain disclosed embodiments calculate a matching score, (e.g., such as that explained below with respect to FIGS. 4, 5, 6A, and 6B), the disclosed embodiments may adjust the score for matched noise words (e.g., multiplied by a factor of 0%-100%) to diminish any erroneous contribution to the matching score, Disclosed embodiments may also adjust the score for other types of matched words, such as synonyms, nicknames, homonyms, word substitutions, or the like.

In one embodiment, server 103 may execute software processes that use one or more rules or preferences to filter or classify the data by attribute. For example, in some embodiments, if the received record includes data that corresponds to names, server 103 may be operable to classify the name into one or ore components (e.g., first name, middle name, last name). Server 103 may be configured to parse the data in the received record into one or more components based on a space or other delimiter. For example, a received record containing "John-Paul Smith, (201) 555-1234" may be processed by server 103 by parsing the record data into separate components, using the spaces, dashes, comma, and parentheses included in the exemplary record as delimiters for each component. In other embodiments, however, the data in the received record may arrive at server 103 already divided into one or more components.

Once server 103 parses the data into one or more components, server 103 may assign the one or more components to attributes and sub-attributes. As mentioned earlier, attributes may represent particular types of text data in the received record and the entity records. For example, the name "Paul Jackson" may be stored as a "name" attribute, and the components of the name, "Paul" and "Jackson," can be stored as first name and last name sub-attributes.

In step 205, server 103 may apply one or more weightings to each attribute. After processing the record in step 203 to determine which attribute or sub-attribute each component corresponds to, weightings may be assigned to those components corresponding to the relative importance of the component. For example, if a received record contains a full name and an address (for example, as shown with respect to exemplary FIG. 6A described below), server 103 may assign the full name with a weight value of 0.65 and the address with a weight of 0.35. In some embodiments, server 103 may be pre-configured for the benefit of the user of server 103 with weight values corresponding to the relative importance, Weight values may be adjusted based on observation, automatically or manually.

Furthermore, server 103 may assign each associated set of attributes and sub-attributes to a separate tier. In certain aspects, a tier may represent a level of information relating to data in a received record. For example, if a record comprises the name "Jennifer Jackson-Smith," server 103 may assign the name attribute to a first tier. Server 103 may also assign the sub-attributes corresponding to this name (for example, "Jennifer," "Jackson-Smith,") to a second tier of sub-attributes. Server 103 can further divide sub-attribute "Jackson-Smith" into "Jackson" and "Smith," and assign those sub-attributes to a third tier. In certain embodiments, server 103 may assign weights to attributes and/or sub-attributes for each assigned tier, corresponding to the relative importance of the component.

In some embodiments, server 103 may be configured to assign weights to attributes and/or sub-attributes such that the value of all assigned weights add up to 1.00 (or close thereto) for each tier of components. For instance, server 103 may assign equal weight to three sub-attributes of a received record (e.g., weights of 0.333, 0.333, and 0.333). In this example, server 103 may be configured to accept the total weight values as a valid assignment of weights because the weights add up to 0.999, which may be within an acceptable threshold value for assigned weights by server 103. Server 103 may be configured to execute software that considers predetermined threshold value(s) for weights associated with given levels or tiers of component parts. In certain embodiments, server 103 may be further configured to execute software for comparing received records to stored entity records; server 103 may calculate separate matching scores for each tier of the received record, and may weigh the scores according to the weights assigned to each tier.

Server 103 may be configured to store data corresponding to the components, attributes, sub-attributes, tiers, and weightings in a memory device for use by one or more processes consistent with the disclosed embodiments.

As an illustrative implementation using the above example of "Jennifer Jackson-Smith," server 103 may assign a weight of 1.00 to the attribute in a first tier ("Jennifer Jackson-Smith"). Server 103 may also assign weights that add up to 1.00 for the remaining tiers. For example, server 103 may assign a weight of 0.65 to the sub-attribute "Jackson-Smith" on the second tier, and a weight of 0.35 to the sub-attribute "Jennifer" on the second tier. This results in the second tier having sub-attributes whose weights add up to 1.00. Server 103 may further assign weights of 0.50 to the sub-attributes "Jackson" and "Smith" on the third tier.

In one embodiment, server 103 may be configured to further subdivide attributes, such as the exemplary full name and address attributes described above. For example, server 103 may be configured to divide a full name into first, middle, and last name sub-attributes. Further, server 103 may be configured to divide an address into street number, street name, town, state, zip code, and country sub-attributes. In some embodiments, server 103 may be configured to assign the weights for the first, middle, and last name such that they add up to 1.00 (or within a threshold value of 1.00), and assign the weights for the street number, street name, town, state, zip code, and country sub-attributes to separately add up to 1.00 (or within a threshold value of 1.00).

In some embodiments, server 103 may be configured to assign weights to certain attributes or sub-attributes based on one or more rules or predefined conditions. For example, server 103 may be configured to assign weights to last names that reflect more significance than other portions of the name (e.g., higher weightings assigned to last names than to first names). Those of ordinary skill in the art will understand that server 103 may be configured to provide other types of subdivisions for attributes and/or sub-attributes of a received record (e.g., "North Main Street" may be divided into a direction, a street name, and a street designation), and that the disclosed embodiments are not limited to names and addresses.

In step 207, server 103 may match one or more attributes determined from the weighted record to one or more attributes in a list of entities (e.g., a watch list, a list of sanctioned or embargoed entities, RFC list, etc.). In one aspect, server 103 may be configured to request and/or access the list of entities from a memory that stores the list (e.g., database(s) 109 or some other memory associated with server 103 or accessible by server 103). In some embodiments, server 103 may be configured to compare the components on the lowest tier of the weighted record against corresponding components on the lowest tier in the list of entities. For example, given the above-mentioned exemplary record (John-Paul Smith, living at 123 North Glen Road, Anytown, N.J., 07046, USA), server 103 may be configured to compare each lowest-tier component in the record to each lowest-tier component of stored entity records on a list. After comparing components and generating scores (for example, as described below with respect to step 209) on the lowest tier of each of the weighted record and at least one entity record, server 103 may compare components on the second lowest tier of each weighted record and at least one entity record in the same manner. In some embodiments, server 103 may perform this comparison on each tier until reaching the highest tier of attributes.

In certain embodiments, server 103 may execute software that performs one or more matching techniques to match one or more components in the weighted record and records in the list of entities in step 207, such as those implemented by matching engine(s) 107, even when the components are not equal on a character basis. For example, the name "John-Paul Smith" in the weighted record can be matched to an entity record with the name "Jon-Paul Smitty," using matching techniques described throughout the rest of this disclosure. This enables disclosed embodiments to properly process and match aliases, nicknames, inconsistently-stored entities, inconsistently-spelled records, or the like.

In some embodiments, if matching engine(s) 107 detect that a component of an entity record contains a substring of a component in a received record, matching engine(s) 107 may determine an exact match between the two components. For example, if a stored entity record contains "Greg" and a received record contains "Gregory," matching engine(s) 107 can detect an exact match. FIG. 4, described below, shows examples of these operations consistent with certain disclosed embodiments.

In certain embodiments, server 103 may execute software implemented by matching engine(s) 107 that performs matching processes to perform step 207. In other embodiments, server 103 may request that matching engine(s) 107 perform the matching process of step 207 and return the results to server 103 for subsequent processing.

In step 209, server 103 may generate a score based on the results of the matching process performed in step 207. In certain embodiments, server 103 may be configured to execute software processes that apply a multiplier to weights assigned to matching components of the received record and list of entity record(s). For example, if server 103 matches a particular component in a weighted record to a component in the list of entities, server 103 may multiply the weight assigned to the component of the received record by a matching technique multiplier. In certain embodiments, server 103 may assign to one or more matching techniques, for example, those that may be used in step 207, specific multipliers. In certain aspects, the multipliers may indicate how aggressive the matching technique is (e.g., a measurement of how "different" the component in the record is to the matched component in an entity record). In certain aspects, aggressiveness may correlate to how much attribute(s) and/or sub-attributes are modified in order to enable a match. For example, server 103 may execute a matching technique that requires that two components must match exactly and thus may assign a multiplier of 1.00 to this less aggressive matching technique. In this example, the multiplier of 1.00 may indicate that a weighting assigned to the component in the weighted record matched using this technique should not be reduced.

However, if server 103 cannot match two components character-for-character, but instead executes a more aggressive matching technique that finds a match after, for example, modifying the entity record and received record to remove double consonants and vowels, the associated multiplier may be assigned a multiplier of 0.85. This exemplary multiplier may indicate a smaller degree of confidence relative to less aggressive techniques (e.g., those assigned a multiplier of 1.00) that the two components actually match, since modifications to the records were needed before finding a match between them.

Exemplary matching techniques consistent with the disclosed embodiments are described below with respect to FIG. 4. Further, exemplary calculations of weightings and implementation of multipliers are described below with respect to FIGS. 6A and 6B. In one embodiment, server 103 may be configured to determine a score representing a likelihood of a match based on the weighting and multipliers (e.g., step 209).

In step 211, server 103 may be configured to compare the calculated score to a threshold. Server 103 may store one or more determined thresholds in memory, which may be accessed and used for comparing in step 211. In one embodiment, a threshold may represent, for example, the likelihood that a received record and an entity record possibly match one another. For example, a threshold may represent the likelihood that a person, company, or other individual or entity involved in a transaction is included on a watch list that represents persons or entities that should be prevented from performing certain transactions. Thus, in certain aspects, server 103 may use the watch list to identify persons or entities in order to perform or direct other devices or computing components to prevent transactions involving those persons or entities. For example, server 103 may calculate score values in step 209 that may range from 0 to 100, inclusive, although the disclosed embodiments may use other score value formats. Server 103 may also store one or more thresholds that reflect a relationship between the score value and confidence in a possible match between the received record and an entity record.

In some embodiments, server 103 may use a single threshold value to determine whether a match is likely or unlikely. For example, in some embodiments, server 103 could determine that a matching score below the threshold would indicate a low likelihood of matching, and that a matching score above the threshold would indicate a high likelihood of matching. For instance, a value of 85 may be set as a threshold. If server 103 determines that an entity record matches a received record with a matching score of 82, server 103 can indicate, for example, that no match was found. In some embodiments, server 103 can still display the match, its associated matching score, and an indication that the matching score is not high enough to be considered a match. If server 103 determines that an entity record matches a received record with a matching score of 91, for example, server 103 can indicate that a likely match has been found.

In other embodiments, server 103 may use multiple thresholds to establish a threshold range. For example, in some embodiments, server 103 could determine that a matching score below the threshold range would indicate a low likelihood of matching, that a matching score in the threshold range would indicate a possible match, and that a matching score above the threshold range would indicate a likely or definite match. For instance, a score from 0 to 75 may reflect a low likelihood of matching; a score from 75 to 85 may reflect a possible match (requiring, for example, a "suspect review" process to allow a human operator or other software process to determine whether the records match); and a score from 85 to 100 may reflect a definite match.

Server 103 may be configured to allow manual or automatic reconfiguration of the particular the threshold values to prevent false positives or negatives. For example, server 103 could be configured with initial values (such as the above values). Based on observed matches, the values can be adjusted manually or automatically to reduce the number of false positives or false negatives. For example, the disclosed embodiments may execute software that provides interface(s) for a user to manually adjust the initial threshold values used by server 103. Alternatively, the disclosed embodiments may execute software that automatically adjusts the threshold values based on certain rules or conditions configured to create threshold values to reduce false positives or false negatives.

In certain embodiments, based on the comparison results of step 211, a human operator, server 103, or some other device or entity, may take some action. For example, server 103 may be configured to generate a message or command to cause the transaction to be paused or stopped. For instance, server 103 may generate and send a message to invoking system 101 that directs the processes controlling the transaction associated with the received record to be paused or stopped. In other embodiments, server 103 may generate an alert. For example, server 103 may generate an alert that is transmitted to a government entity or other entity (or computer device in network layout 100) indicating that a particular participant may be attempting to participate in a financial transaction. In other embodiments, server 103 may generate a command or message that initiates a process that allows a human operator (or a computer executed process) to perform a suspect review process, or the like. A suspect review process, for example, may include providing on a display in an interface both the entity record and the received record, along with other information (e.g., information about the transaction, information about the particular matches made between components of the entity record and the weighted record, calculations concerning the determination of a match between the two entities (such as the calculations in FIG. 6B), or the like), and allow a human operator to decide whether or not the two records match via the interface. Server 103 may perform or direct another computer device to perform the suspect review process when, for example, a score falls within a certain threshold value range reflecting a particular uncertainty that the entity record matches the received record.

Figure 3:
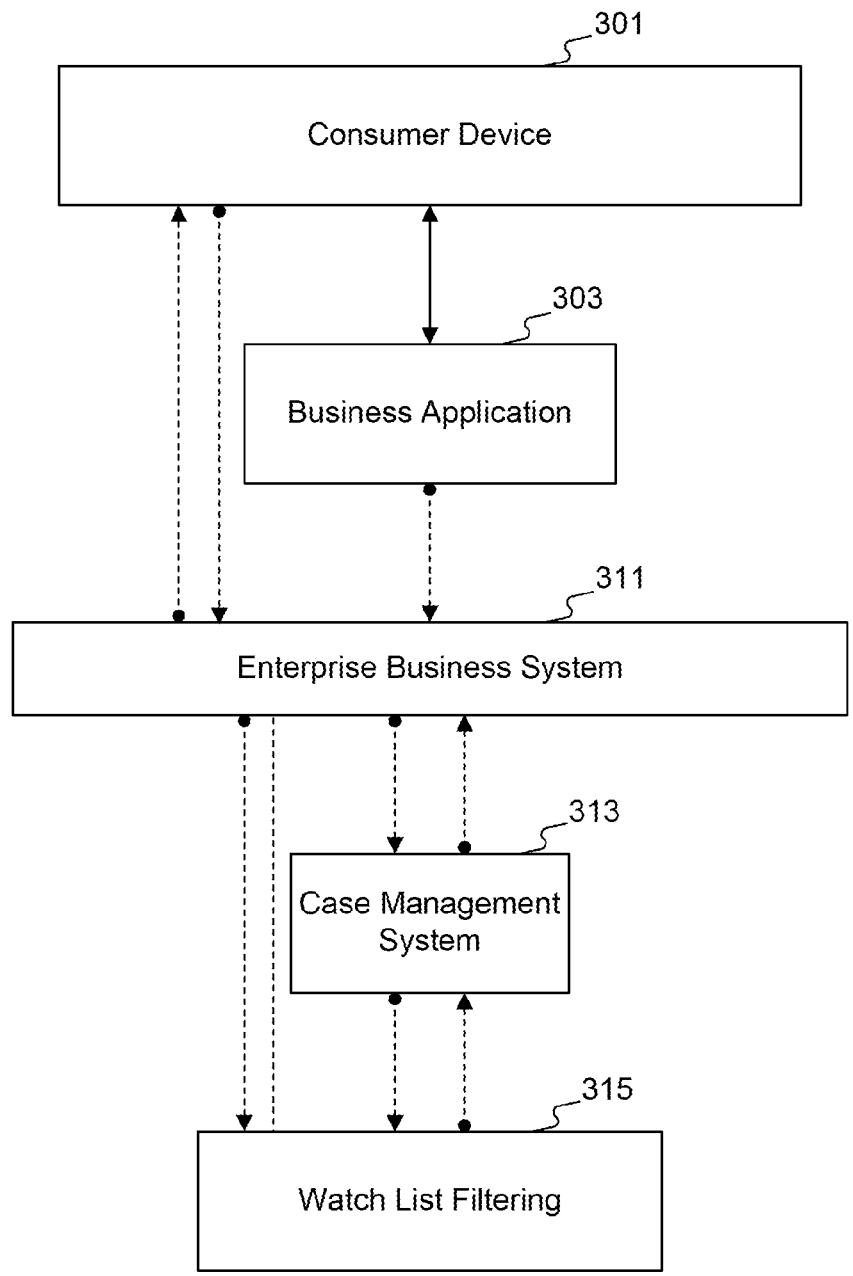
FIG. 3 is an exemplary module diagram 300 consistent with disclosed embodiments.

FIG. 3 is an exemplary module diagram 300 for performing certain processes consistent with disclosed embodiments. The components in diagram 300 may represent an exemplary implementation of devices and processes consistent with certain disclosed embodiments.

For example, consumer device 301, which may be implemented as invoking system 101, may be configured to provide records for checking against a watch list. In one aspect, consumer device 301 may be implemented as a financial device operable to send and receive funds, open and close financial accounts, perform auditing of transactions, or the like. In one embodiment, consumer device 301 may initiate exemplary watch list matching processes by sending the records or by request in other forms, such as a message request, etc.

Business Application 303 may be implemented as a website or portal provided by server 103 that consumer device 301 may access over a network, such as network 105, to perform one or more processes consistent with the disclosed embodiments. In one embodiment, Business Application 303 may be configured to provide an online interface that is accessible by consumer device 301 to allow consumer device 301 to interact with and control the flow of records and/or alerts. For example, Business Application 303 may provide consumer device 301 with a GUI (Graphical User Interface) that includes record search results provided by server 103. In some embodiments, consumer device 301 may display the GUI on a display device to a user to enable the user to perform a suspect review process. In other embodiments, Business Application 303 may be configured to receive watch list alerts and generate interface(s) for displaying the alerts on a display device associated with consumer device 301.

Figure 7:
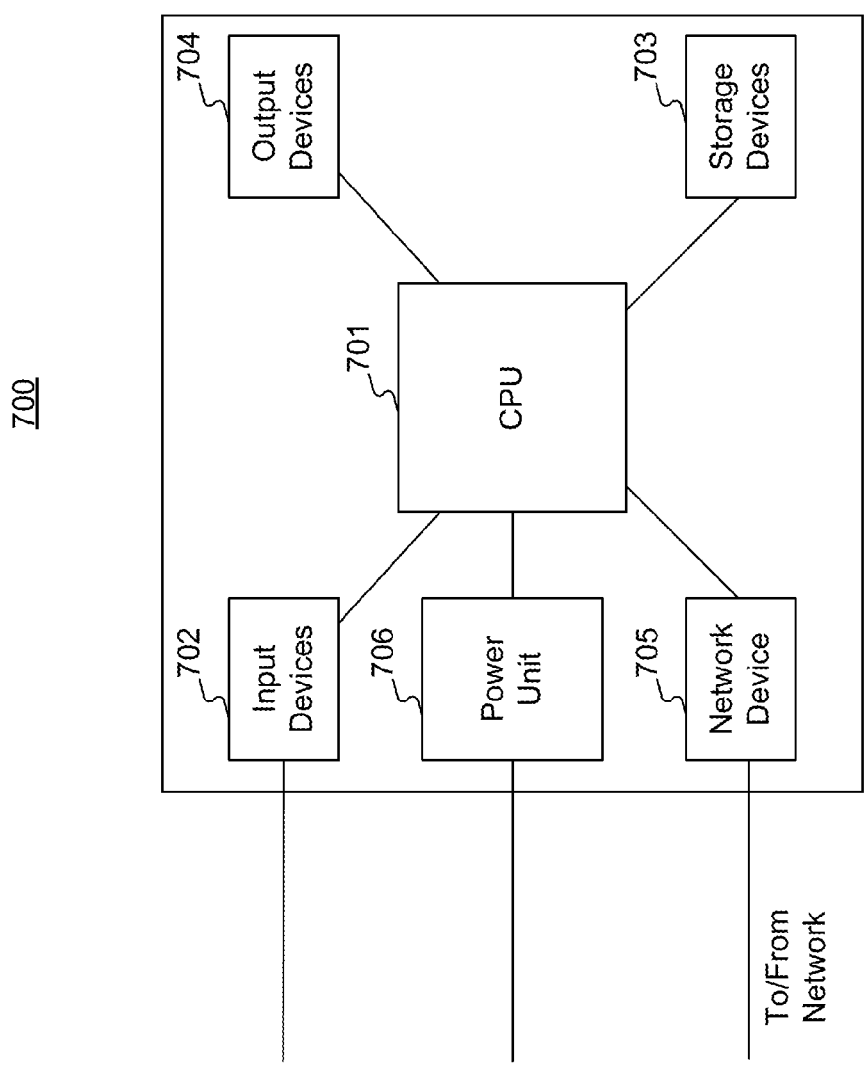
FIG. 7 is an exemplary computing device 700, consistent with disclosed embodiments.

Enterprise Business System 311 may be implemented as a device, such as the computer device described in FIG. 7. Enterprise Business System 311 may facilitate communications between any or all of consumer device 301, Business Application 303, Case Management System 313, or Watch List Filtering module 315.

For example, in some embodiments, Enterprise Business System 311 may receive records from consumer device 301 for the purpose of matching against known entity records. Enterprise Business System 311 may also communicate with consumer device 301 in order to allow for watch list management or quality review (for example, to allow consumer device 301 to give feedback on the quality of matching performed by implementations of the systems and methods of the disclosed embodiments). Enterprise Business System 311 may also communicate with Business Application 303 to deliver results of attempts to match participant records against stored entity records.

Case Management System 313 may be implemented as a device, such as the computer device described in FIG. 7. In some embodiments, Case Management System 313 may be configured to perform event-based resolution. For example, Case Management System 313 may receive records from Enterprise Business System 311 (which may have received them from consumer device 301) and deliver the records to Watch List Filtering module 315 for matching.

Case Management System 313 may also be configured to perform suspect review services. Suspect review services may be implemented as, for example, a set of web services that enables financial institutions to review potential matches between participant data and entity records in real-time. For example, as described earlier, some calculated matching scores may not be high enough to indicate that a participant is on a sanction, embargo, watch, or other type of list, but may not be low enough to rule out the presence of that party on the list. Thus, in some embodiments, suspect review services enable financial institutions or other individuals to determine whether or not the transaction should be paused or stopped, by enabling manual or further automated determination of matching between the received record and the entity record.

Case Management System 313 may also be configured to perform implicit acceptance listing. Implicit acceptance listing may be implemented as a list of previously-approved participants. For example, Case Management System 313 may consult an implicit accept list which contains the names of participants who have previously been matched and determined to not be suspect. In some embodiments, Case Management System 313 may determine that two participants to a transaction have previously been cleared to transact, and thus will not attempt to pass the participant names to Watch List Filtering module 315.

Case Management System 313 may also be configured to execute software that performs one or more billing processes to create and send bills to consumer device 301 for use of the systems and methods disclosed herein. For example, if consumer device 301 is operated by a user associated with a financial institution to request and receive results regarding checking uses participant names against lists of prohibited or suspect individuals, the financial institution may be billed for its usage of the system. In certain aspects, Case Management System 313 may charge the financial institution on any basis, such as for example, on a per-transaction basis, on a recurring fee basis, or the like.

Case Management System 313 may also capture or retrieve audit metrics for use with various reporting processes. For example, Case Management System 313 may capture metrics on how often participants are matched with entity records on lists, metrics on the transactions that matched participants are involved in, metrics regarding changes in a list (for example, database(s) 109), metrics regarding the formatting of participant records or information, metrics on customer usage, or other types of data, as one of ordinary skill will understand.

Case Management System 313 may also record suspect matches in a database. For example, Case Management System 313 may be configured to record matches of a participant against entity data for purposes of auditing, reporting, or the like.

Watch List Filtering (WLF) module 315 may be implemented as a device, such as the computer device described in FIG. 7. In some embodiments, WLF 315 may perform comparisons between received records and entity records stored on multiple watch lists and report results back to various devices, including Enterprise Business System 311 and Case Management System 313. WLF 315 also enables batch and real-time processing of comparisons, as well as formatting and reporting of matching results.

WLF 315 may also, in some embodiments, enable incremental or full filtering of known good entities. For example, WLF 315 may attempt to match previous-verified individuals against new parties added to a sanction list.

In some embodiments, consumer device 301 may provide records, such as participant names, in a transaction in real time to Enterprise Business System 311 (e.g., sending a single name each time a name is received in a transaction and/or a record is generated in association with the transaction). In another embodiment, Enterprise Business System 311 may provide records, such as participant names in a transaction, to WLF 315 in real-time. Consumer device 301 and/or Enterprise Business System 311 may also provide records in bulk or batch form, by sending multiple records at one time, in a single message, or in other manners known to one skilled in the art.

FIG. 4 is an exemplary tiered methodology 400, usable for filtering incoming records and matching against known entities, consistent with disclosed embodiments.

Data structure 400 may represent a table of adjustable matching techniques for use with the disclosed embodiments. In one aspect, data structure 400 may be a table stored in a memory device accessible by server 103 to perform filtering and/or matching processes consistent with disclosed embodiments. In certain embodiments, data structure 400 may include matching techniques 401A-401G that are each associated with a respective multiplier 403A-403G. In one embodiment, server 103 may use one or more matching techniques 401A-401G and multipliers 403A-403G to calculate a confidence level of a proposed match between two components of a received record and an entity list record, such as that performed in the processes of FIG. 2. The disclosed embodiments may implement other matching techniques and multipliers other than those exemplified in FIG. 4, and the techniques and multipliers depicted in FIG. 4 are merely exemplary and illustrative.

In one embodiment, data structure 400 may be a list including an association between exemplary matching techniques and exemplary multiplier values. The software for performing the matching techniques identified in data structure 400 (or techniques not illustrated in FIG. 4), when executed by a processor (e.g., a processor included in server 103), may be stored in a memory accessible by server 103 or matching engine(s) 107. Thus, it is understood that the matching techniques listed in data structure 400 and described below may be implemented as software instructions that are executed by one or more processors and may be stored in other memory locations and programmed in known computer-executable programming languages.

In one embodiment, Exact String Filter 401A may reflect a matching technique that produces a match when two components (e.g., attributes or sub-attributes) match one another character-for-character. In some embodiments, this filter may be case-insensitive (i.e., "SMITH" matches "Smith," "smiTH," and "sMiTh"). Filter 401A may be associated with multiplier 403A, corresponding to 1.00, which may indicate that a match using Exact String Filter 401A should not affect the calculation of a matching score.

Preprocessed Name Filter 401B may reflect a matching technique that produces a match when a preprocessed component in an entity record matches a component in a received record. In one embodiment, a preprocessed component may be a component that has had some initial modifications (or "preprocessing") performed, such as removing double consonants, removing punctuation and other non-alphabetic characters, or the like. For example, server 103, for example, may execute software that performs preprocessing on a character string "Mohammad" to change it to "Mohamed." Filter 401B may be associated with multiplier 403B, corresponding to 0.95. This corresponding value may indicate that a match using Preprocessed Name Filter 401B should only contribute 95% of the component's weight to the matching score.

Preprocessed Name, Vowels Changed to Zeros Filter 401C may be a matching technique that produces a result that indicates that a preprocessed component whose vowels have been changed to the number zero ('0') matches a component in a received record whose vowels have been changed in the same way. For example, this filter may match the name "%% Britt@$" in the entity record to "Bret" in a received record. Server 103, or another computing device, may preprocess the entity record "%% Britt@$" to "Brit" (removing double consonants and nonalphabetic characters), and then modify the preprocessed name to "Br0t" (vowels changed to zeros). This could match the received record "Bret" by changing the vowels in that record to zeros—yielding "Br0t." Filter 401C may be associated with multiplier 403C, corresponding to 0.90, which may indicate that a match using this filter should only contribute 90% of the component's weight to the matching score.

Preprocessed Name, Vowels Removed Filter 401D may be a matching technique that produces a result that indicates that a preprocessed component whose vowels have been removed matches a component in a received record whose vowels have also been removed. For example, this filter could match the name "Braeburn" in the entity record to "Briborn" in a received record. The entity record "Braeburn" could be modified to "Brbrn" (vowels removed). This could match the received record "Briborn" because removing the vowels in that record would yield "Brbrn" as well. Filter 401D may be associated with multiplier 403D, corresponding to 0.85, which may indicate that a match using this filter should only contribute 85% of the component's weight to the matching score.

Preprocessed Name, Vowels Changed to Zeros, Consonants to Soundex 401E may be a matching technique that produces a result that indicates that a preprocessed component whose vowels have changed to zeros and consonants have been modified using a Soundex algorithm matches a component in a received record whose vowels and consonants have been modified in the same way. Soundex algorithms, in some embodiments, enable similar names to be indexed in a similar way. For example, one embodiment of a Soundex algorithm constructs a four-character Soundex code in the form of "X # # #," where X corresponds to the first letter of the name, and ### corresponds to numbers that represent letters. For example, the coding for the numbers 1 through 6 may be represented by:

| | |
|---|---|
| 1 | B, F, P, V |
| 2 | C, G, J, K, Q, S, X, Z |
| 3 | D, T |
| 4 | L |
| 5 | M, N |
| 6 | R |

As one example, this filter may be configured to match the name "Washington" in the entity record to "Wishangton." Server 103, or another computer device, may execute software that codes the name "Washington" as "W-252" (W, S=2, N=5, G=2), and "Wishangton" as "W-252" (W, S=2, H=5, G=2). In one embodiment, this filter may be configured to ignore other letters (including vowels, H, and Y). Additionally, the disclosed embodiments may implement other rules to create a Soundex code, such as, for example, treating double letters as a single letter, treating two letters with the same corresponding number as a single letter, ignoring a name prefix such as "Van" or "De," etc. However, many variations of Soundex are possible, and the disclosed embodiments are not intended to be limited to any particular embodiment of Soundex (or similar algorithm). Filter 401E may be associated with multiplier 403E, corresponding to 0.70, which may indicate that a match using this filter should only contribute 70% of the component's weight to the matching score.

Partial Names Filter 401F may be a matching technique that produces a result that indicates that a component in an entity record matches a component in a received record if the component in the received record contains parts of the component in the entity record or vice versa. For example, this filter may match a received record of "James" to an entity record including "Jameson." Filter 401F may be associated with multiplier 403F, corresponding to 0.65, which may indicate that a match using this filter should only contribute 65% of the component's weight to the matching score.

Commonly Misspelled Words Filter 401G may be a matching technique that produces a result that indicates that an attribute or sub-attribute in an entity record matches an attribute or sub-attribute in a received record, if one is a common misspelling of the other. For example, this filter may match a received record of "Neal" to an entity record of "Neil." Filter 401G may be associated with multiplier 403G, corresponding to 0.60, which may indicate that a match using this filter should only contribute 60% of the component's weight to the matching score.

The disclosed embodiments may associate other matching technique filters with other multipliers. For example, filters can be used to discover that a name in one position of an entity record (for example, a middle name) matches a name in another position of the received record (for example, a last name), to discover partial matches, to discover names within names, or the like. In some embodiments, the exemplary filters in FIG. 4 may represent a determination that a stored entity record is at least a substring of a received record. For example, server 103 may find a match between a stored record of "Greg" and a received record of "Gregory" using Exact String Filter 401A, because the first four characters of the received record ("Greg") match the entire stored record ("Greg").

Other filters may be applied before or after attempting to match entity records and received records. For example, a pre-filter may be used to add information (or attributes) that is only relevant or important to a particular company or organization, but not across the entire industry or market segment. Post-filters may be used to remove or decrease the contribution of certain attributes of one or more known entities based on a user's preference. As mentioned above, post-filters can adjust the matching score for a particular word by a factor of 0%-100%. Post-filters, in some embodiments, may adjust the scores for matched noise words—for example, a user in the banking industry may designate the word "bank" a noise word because he does not want "bank" to be significant in matching. If a post-filter matches "bank" in an entity record to "bank" in a received record, the amount of the matching score attributed to the matching of those words can be adjusted down by a factor of 0%-100%, to reduce the effect that the match has on the matching score. Post-filters, in some embodiments, also may adjust scores for other types of matched words. For example, post-filters can determine whether one word is a synonym, substitution, nickname, or homonym of another word. Post-filters can adjust matching scores if these words are found and make up part of a matching score. The particular values by which each word or type of word are adjusted are configurable.

In some embodiments, each matching technique may be applied in a specific order. For example, when attempting to match components in a record to components in an entity, certain disclosed embodiments may attempt to match the components using Exact String Filter 401A first; if this is unsuccessful, disclosed embodiment may attempt to match the components using Preprocessed Name Filter 401B; etc. However, as one of ordinary skill in the art will recognize, other techniques and/or orders of these techniques may be implemented as well. Additionally, while FIG. 4 is illustrated using names, this is merely exemplary. Other types of data may be filtered and matched as well.

FIG. 5 is an exemplary set of records 500, for use in explaining exemplary operations, functions, structures, and features of exemplary embodiments of this disclosure. In certain embodiments, list 500 may be stored in a memory, such as database(s) 109, and may include persons and/or entities that are present in a list that may be used by server 103 for performing matching processes consistent with disclosed embodiments. Exemplary list 500 may include fields 521-545 that represent entity records; however, other fields may be included in entity lists consistent with the disclosed embodiments.

Field 521 may correspond to an identifier (ID) for the entity (or person); in some embodiments, the identifier may be unique for each entity so as to enable database lookups on that identifier. In exemplary entity records 551-554, each ID is numeric; however, other types of identifiers may be implemented by the disclosed embodiments, as will be recognized by one of ordinary skill in the art.

Field 523 may represent the original string corresponding to part of a given entity record. For example, field 523 may correspond to a component of the entity identification. Field 525 may represent a preprocessed version of the string stored in field 523. Preprocessing may be used to remove numbers, other non-letter characters, duplicated letters (either consecutively or otherwise), or the like. For example, exemplary entity record 554, containing "Johnson & Smith, Inc.," may be preprocessed and stored as "Johnson Smith Inc" by removing punctuation (commas, periods, and ampersands). As another example, entity record 551 may have a first name of "Muhammad," which has been preprocessed to yield "Muhamad" in field 525. Preprocessing may be performed by any device (such as database(s) 109 or server 103) before storing the data in List 500.

Field 527 may represent the weight assigned to the first string in fields 523 and 525. As will be described later with respect to FIG. 6A, different weights may be assigned to each attribute or sub-attribute, based on the makeup of the rest of the entity. For example, given the full name for exemplary entity record 552 ("Dennis Smith"), each of the first name attribute ("Dennis") and the last name attribute ("Smith") may be given 0.50 weight, as each portion may be configured by the disclosed embodiments as being of equal importance. In some embodiments, weighting may depend on the number of components that compose each sub-attribute and/or attribute. For example, in exemplary entity record 553, "Timothy-John Addams" may be stored across three strings—corresponding to "Timothy," "John," and "Addams." Both the first name ("Timothy-John") and the last name ("Addams") may each be assigned a weight of 0.50; however, since the first name has multiple sub-attributes to it, each sub-attribute of the first name ("Timothy" and "John") may be assigned half of 0.50, or 0.25, as weight. As explained with respect to FIGS. 6A and 6B below. In some embodiments, the weights for all parts of an entity record must add up to 1.00 (or close to account for rounding). The disclosed embodiments may be configured to execute software processes that generate these types of weights based on the number of components that compose each sub-attribute and/or attribute.

Field 529 may reflect an identifier for the string represented in field 523. For example, entity record 551 (corresponding to "Muhammad Jaffar-Ali") contains the name "Muhammad," identified as the first name for that entity. Entity record 551 may also contain two last names—"Jaffar" and "Ali"—identified as "LastName-1" and "LastName-2," in 537 and 545, respectively, corresponding to each part of the last name for that entity. As another example, entity record 554 may contain only one string, in field 523, which may represent a company's name (shown in field 529 as "CompanyName").

While only names are shown in exemplary List 500, other information, such as addresses, passport numbers, identifiers, or the like, can also be stored in List 500. As these other pieces of information may correspond to other attributes, the sub-attributes corresponding to these attributes may add up to 1.00 separate from sub-attributes of other attributes. Additionally, the particular configuration of List 500, including the structure thereof, is merely exemplary. One of ordinary skill in the art will understand that the disclosed embodiments may implement other configurations.

Figure 6A:
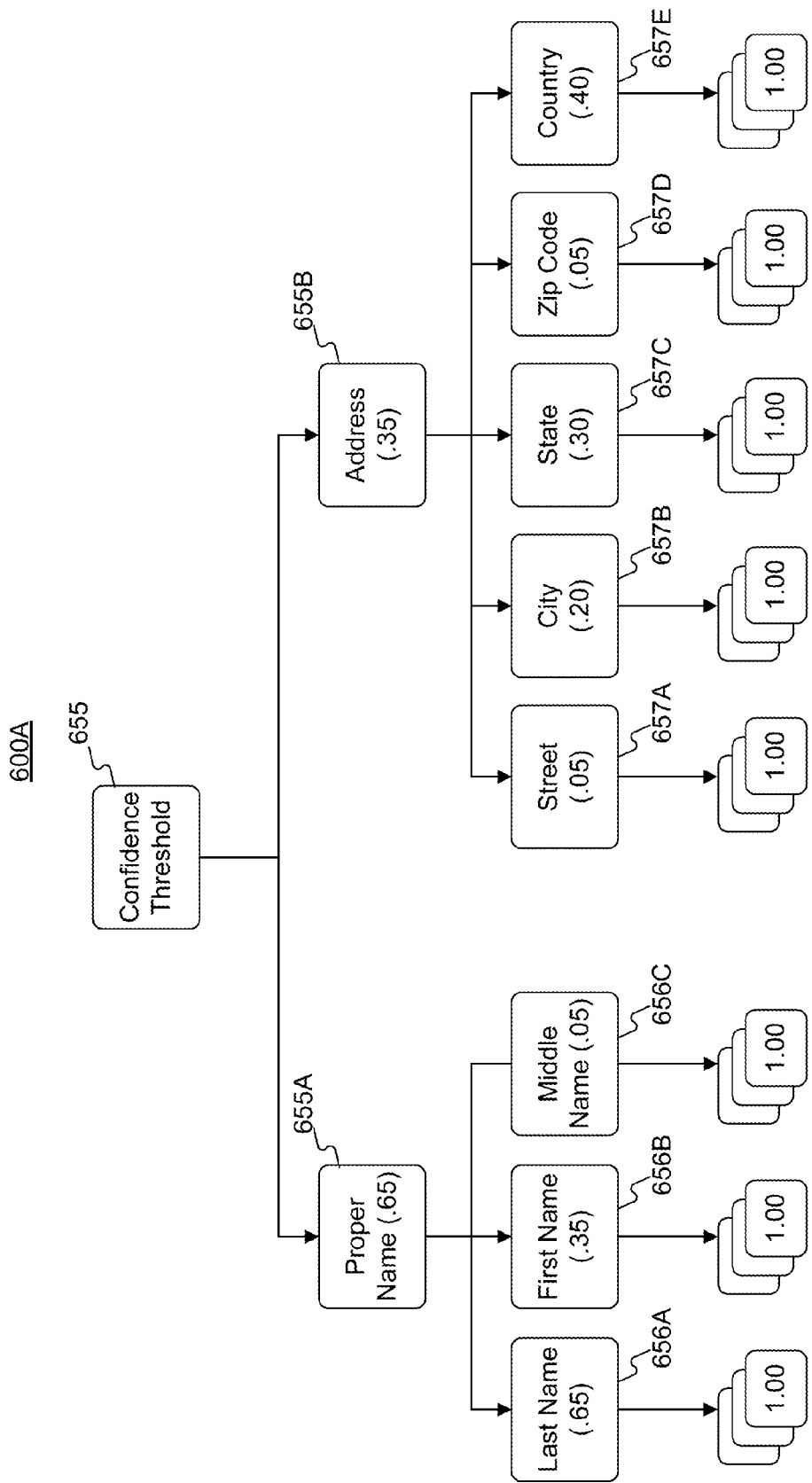
FIG. 6A is an exemplary representation of tiered confidence threshold scoring 600A, consistent with disclosed embodiments.

FIG. 6A is an exemplary representation of tiered confidence threshold scoring 600A, consistent with disclosed embodiments. Scoring 600A may represent an exemplary entity record containing a Proper Name attribute 655A and an Address attribute 655B. In one embodiment, Confidence Threshold 655 may represent the total weight given to an entity record. In some embodiments, Confidence Threshold 655 may be equal to 1.00, and the weights corresponding to the attributes that make up that entity record must add up to 1.00. For example, the entity's proper name could be given a weight of 0.65, while the associated address could be given a weight of 0.35. In accordance with certain embodiments, the weighting of the different portions of the entity record may affect the importance of those portions in determining a match between a received record and an entity. For instance, a weighting of 0.01 for a particular attribute may be utilized by the disclosed embodiments such that even an absence of that attribute in a received record may not affect the outcome of a matching as much as an attribute with a weighting of 0.99.

Continuing with the above example of an entity with the name John-Paul Smith, living at 123 North Glen Road, Anytown, N.J., 07046, USA, the disclosed embodiments may divide these exemplary individual attributes into their respective components as follows. The entity's name ("John-Paul Smith") may be weighted as 0.65, and the address ("123 North Glen Road, Anytown, N.J., 07046, USA") can be weighted to equal 0.35 of the Confidence Threshold 655. These are represented by Proper Name 655A and Address 655B.

As previously mentioned, the disclosed embodiments may be configured to further divide attributes into sub-attributes. In certain embodiments, in order to properly weight each sub-attribute, the weights of each sub-attribute of an attribute may be assigned such that they add up to a specific number, for example, 1.00. For instance, as shown in exemplary FIG. 6A, Last Name 656A ("Smith") may be weighted to 0.60, First Name 656B ("John-Paul") may be weighted to 0.35, and Middle Name 656C (none in this example) may be weighted to 0.05. For the address of the entity record, Street 657A ("North Glen Road") may be weighted as 0.05, City 657B ("Anytown") as 0.20, State 657C ("NJ") as 0.30, Zip Code 657D ("07046") as 0.05, and Country 657E ("USA") as 0.40.

In other embodiments, some of these records, for example, First Name 656B and Street 657A, may be further divided into smaller components. In certain aspects, the disclosed embodiments may be configured to assign the weights to those individual components such that they add up to 1.00 (or within a threshold of 1.00) as a group. For example, if First Name 656B were divided into components of "John" and "Paul," weights assigned to each of "John" and "Paul" must add up to 1.00 (or within a threshold of 1.00).

Figure 6B:
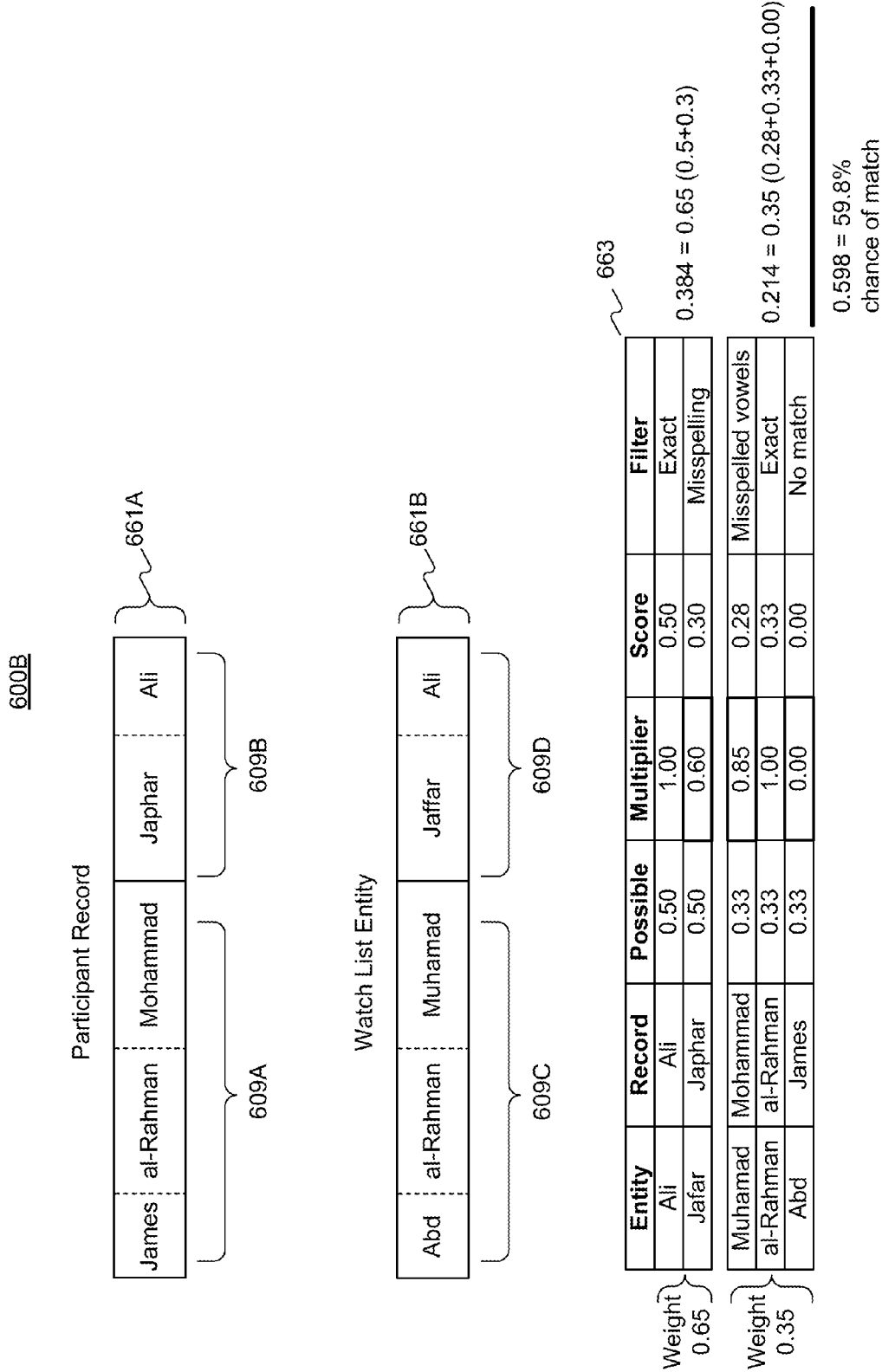
FIG. 6B is an exemplary comparison 600B of participant record 661A and a watch list entity 661B, consistent with disclosed embodiments.

FIG. 6B is an exemplary comparison 600B of participant record 661A and a watch list entity 661B, consistent with disclosed embodiments. Exemplary Participant Record 661A may be received by a device such as server 103 from a device such as invoking system 101 in connection with a transaction. For example, record 661A may be received and processed in a manner similar to the received record described above in connection with FIG. 2. In some embodiments, this record may be associated with a transaction, such as a financial transaction, and may be related to one or more participants in that transaction. In certain embodiments, server 103 may be configured to calculate a matching score for an attribute by multiplying the weighting assigned to an attribute by the sum of the sub-attributes associated with that attribute.

In exemplary FIG. 6B, participant record 661A represents the name "James al-Rahman Mohammad Japhar Ali." As mentioned before, participant records and entity records may be divided into their component parts. In exemplary participant record 661A, First name 609A contains "James al-Rahman Mohammad," and Last name 609B contains "Japhar Ali."

Watch list entry 661B may represent an entry on a watch list that may be stored in memory, such as one of database(s) 109 of FIG. 1. As mentioned before, watch list entries (such as entry 661B) may represent entities whose transactions should be stopped, paused, flagged, or made known to appropriate persons, entities, and/or authorities. In FIG. 6B, exemplary watch first entry 661B may represent the name "Abd al-Rahman Muhammad Jaffar Ali." Again, as mentioned before, records and entities may be divided into their component parts; thus, in exemplary watch list entity 661B, First name 609C contains "Abd al-Rahman Muhammad," and Last name 609D contains "Jaffar Ali."

Similar to the processes performed in connection with FIG. 2, server 103, or another computing device, may perform a comparison between the component parts of each of Participant Record 661A and Watch List Entity 661B. The disclosed embodiments may compare the attributes on a component-by-component basis, and in some embodiments comparison begins with the last element in the record. For example, the disclosed embodiments may be configured to compare the second portion of Last Name 609B of Participant Record 661A ("Ali") to the second portion of Last Name 609D of Watch List Entity 661B ("Ali"), In this example, because there are two portions to Last Name 609B, each portion of Last Name 609B may each have a highest possible score of 0.50.

In certain aspects, the disclosed embodiments may perform one or more matching techniques, and may do so in a particular sequence. For example, the disclosed embodiments may begin with a first matching technique, such as Exact String Filter 401A from FIG. 4. Server 103 (or a similar device) may compare the two strings "Ali" (from Participant Record 661A) and "Ali" (from Watch List Entity 661B). Finding that the two strings match one another exactly, server 103 may apply a multiplier associated with the filter (e.g., multiplier 403A, equal to 1.00) to the possible score 0.50, to yield a matching score of 0.50 for that component.

Moving to the first portion of Last Name 609B in Participant Record 661A ("Japhar"), the disclosed embodiments may compare this string with the first portion of Last Name 609D in Watch List Entity 661B ("Jaffar"). Beginning with a first matching technique, for example, Exact String Filter 401A from FIG. 4, server 103 may compare the two strings "Japhar" (from Participant Record 661A) and "Jaffar" (from Watch List Entity 661B). Finding that the two strings do not match one another, server 103 may proceed to use a second matching technique, such as Preprocessed Name Filter 401B (with associated multiplier 0.95) in an attempt to match "Japhar" with "Jaffar."

Finding that this does not yield a match, server 103 may use other filters 401C-401F consecutively (or simultaneously) to match these names. In some embodiments, each successively used matching technique may have a lower associated multiplier. Eventually, server 103 may use filter 401G, corresponding to a filter for commonly misspelled words, and, finding that "Japhar" is a common misspelling of "Jaffar," determine that a match has been made. The multiplier associated with Filter 401G (e.g., 0.60) may be multiplied by the maximum possible score 0.50, to yield a matching score of 0.30 for that component.

The remainder of table 663 illustrates exemplary component matching attempts between other components of the exemplary name in record 661A. For example, server 103 may find that the first portion of First Name 609A ("James") does not match the first portion of First Name 609C ("Abd"), and that there are no filters that are able to match the two components to one another. In such a situation, server 103 may determine that no match has been made and that a multiplier of 0.0 should be applied, thus awarding no matching score to this component.

The disclosed embodiments may calculate a final score for this matching based on the scores and the weights associated with each portion of the record. The disclosed embodiments may calculate a final score by, for example, summing the scores of each component part of an attribute, and multiplying that score by the associated weight. For example, using the exemplary illustration in FIG. 6A, assume that First Name 609C has an associated weight of 0.35, and Last Name 609D has an associated weight of 0.65. Based on these exemplary weight values, disclosed embodiments may calculate the score for the first name ("Abd al-Rahman Muhamad") as 0.35*(0.0+0.33+0.28)=0.214, and the score for the last name ("Jaffar Ali") as 0.65*(0.30+0.50)=0.384. Using these examples, the disclosed embodiments may calculate the combined matching score for Participant Record 661A against Watch List Entity 661B by adding the two scores together. The exemplary calculation (0.598) may represent a 59.8% confidence level that Participant Record 661A matches Watch List Entity 661B.

Consistent with the description of FIG. 6A, the disclosed embodiments may combine the matching score corresponding to the name in the record may with other elements in Participant Record 661A. For example, FIG. 6A shows an exemplary weight for Proper Name 655A as 0.65 and an exemplary weight for address 655B as 0.35. The disclosed embodiments may be configured to perform processes such that if an address corresponding to Participant Record 661A received a 1.00 matching score with a corresponding entity record, the address score (1.00) would be weighted with 0.35, and the above name score (0.598) would be weighted with 0.65. This exemplary determination processes yield a confidence level of 0.739: 0.35*(1.00)+0.65*(0.598)=0.739, or a 73.9% chance of a match.

The disclosed embodiments may be configured to generate information that is used to display calculated scores and the component parts that make up the score to a user such that the user may take appropriate action (including alerts, stopping/pausing a transaction, etc.) Additionally, table 663 may also be displayed or stored for further analysis (e.g. by a human operator or software processes executed by a processor). For example, table 663 may be displayed on a computer (such as invoking device 101) to allow an operator to adjust the previously-mentioned thresholds to avoid false positives/negatives.

FIG. 7 is an exemplary computing device 700, consistent with disclosed embodiments. Variations of computer device 700 may be used for implementing invoking system 101, server 105, database(s) 109, or matching engine(s) 107.

As shown in FIG. 7, exemplary computer device 700 may include one or more central processing units 701 for managing and processing data and operations consistent with the disclosed embodiments. CPU 701 may be configured to process data, execute software instructions stored in memory, and transmit data between the other components of device 700. For example, CPU 701 may be implemented as a mobile microprocessor, a desktop microprocessor, a server microprocessor, or any other type of processor, as one of ordinary skill will understand.

In some embodiments, computer device 700 may also include one or more input devices 702, which are configured to receive input from a user, other computers, other devices, or other modules. Input devices 702 may include, but are not limited to, keyboards, mice, trackballs, trackpads, scanners, cameras, external storage or information devices, and other devices, which connect via Universal Serial Bus (USB), serial, parallel, infrared, wireless, wired, or other connections.

Computer device 700 may also include one or more storage devices 703. Storage devices 703 may be comprise optical, magnetic, signal, or any other type of memory configured to store information. Storage devices 703 may store, for example, data, instructions, programs/applications, operating systems, or a combination of these.

Computer device 700 also includes one or more output devices 704 that may be configured to transmit data to users and/or modules or devices. Such modules or devices may include, but are not limited to, computer monitors, televisions, screens, interface ports, projectors, printers, plotters, and other recording/displaying devices which connect via wired or wireless connections.

Computer device 700 may also include one or more network devices 705. Network device 705 may be configured to allow computer device 700 to connect to and exchange information with networks (e.g., network 105), such as the Internet, a local area network, a wide area network, a cellular network, a wireless network, or any other type of network. Network device 705 may be implemented as a wired network adapter, a wireless network adapter, an infrared network adapter, a cellular or satellite network adapter, or any other type of network adapter.

Computer device 700 may also include one or more power units 706, which may enable computer device 700 and its components to receive power and operate. While FIG. 7 illustrates the components in FIG. 7 as connected to CPU 701, other connections and configurations are possible, such as a "bus" or other connective links. Additionally, while the devices in FIG. 7 are represented in a singular form, in some embodiments, more than one of each of the devices in FIG. 7 may be implemented.

Various embodiments have been described with reference to the accompanying drawings and embodiments. It will, however, be evident that various modifications and changes may be made thereto, and additional embodiments may be implemented, without departing from the present disclosure. The specification and drawings are accordingly to be regarded in an illustrative rather than restrictive sense.

For example, advantageous results may still be achieved if steps of the disclosed methods were performed in a different order and/or if components in the disclosed systems were combined in a different manner and/or replaced or supplemented by other components. Other implementations are also within the scope of the present disclosure.

It is to be understood that both the foregoing general description and the following detailed description are exemplary and explanatory only and are not restrictive of the disclosed embodiments, as claimed.

The accompanying drawings, which are incorporated in and constitute a part of this specification, illustrate one or more embodiments and together with the description, serve to explain certain aspects of the disclosed embodiments.

What is claimed is:

1. A method for filtering a received record associated with at least one record attribute against an entity record, the method comprising:

applying, by one or more processors, a record attribute weight to the at least one record attribute associated with the received record, the at least one record attribute comprising at least one record sub-attribute associated with a corresponding sub-attribute weight;

performing, by the one or more processors, at least one matching technique that compares the at least one record sub-attribute of the received record against at least one sub-attribute of the entity record, wherein the at least one matching technique is associated with a corresponding matching technique multiplier;

for each of the at least one record sub-attributes that matches an entity record sub-attribute of the entity record, determining, by the one or more processors, a record sub-attribute matching score for the matching record based on the corresponding sub-attribute weight associated with the matching record sub-attribute and the corresponding matching technique multiplier associated with the at least one matching technique;

determining, by the one or more processors, a matching score based on (1) a sum of each record sub-attribute matching score for each matching record sub-attribute of the at least one record attribute and (2) the record attribute weight of the at least one record attribute; and comparing, by the one or more processors, the matching score to a threshold to determine whether the received record represents a suspect entity.

2. The method of claim 1, wherein performing the at least one matching technique further comprises:

performing, by the one or more processors, a first matching technique to determine whether a first record sub-attribute of the received record matches the at least one entity record sub-attribute in the entity record;

if the first matching technique determines that the first record sub-attribute does not match the at least one entity record sub-attribute, performing, by the one or more processors, a second matching technique to determine whether the first record sub-attribute matches the at least one entity record sub-attribute; and if none of the first or second matching techniques determines that the first record sub-attribute matches the at least one entity record sub-attribute, determining, by the one or more processors, that the first record sub-attribute does not match the at least one entity record attribute in the entity record, and multiplying the corresponding sub-attribute weight of the first record sub-attribute by 0.

3. The method of claim 2, further comprising determining that the first record sub-attribute matches the at least one entity record sub-attribute when the first matching technique or the second matching technique determines that characters of the first record sub-attribute are equal to characters of the at least one entity record sub-attribute.

4. The method of claim 1, wherein a sum of the record sub-attribute weights is equal or equivalent to 1.

5. The method of claim 1, wherein determining the record attribute matching score comprises multiplying the record attribute weight by the sum of the record sub-attribute scores for each matching record sub-attribute of the at least one record attribute.

6. The method of claim 1, wherein the sum of the record attribute weights applied to the at least one attribute is equal or equivalent to 1.

7. The method of claim 1, wherein the received record comprises at least one name of a participant in a financial transaction.

8. The method of claim 1, wherein the at least one matching technique includes at least one of an exact match technique, a preprocessed match technique, a preprocessed match with vowels changed to zeros technique, a preprocessed match with vowels removed technique, a preprocessed match with vowels changes to zeros and consonants changed to Soundex technique, a partial attribute match technique, or a commonly-misspelled attribute match technique.

9. The method of claim 2, wherein the first matching technique is associated with a first weighting, and the second matching technique is associated with a second weighting less than the first weighting.

10. The method of claim 9, wherein the first and second matching techniques are selected from an exact match technique, a preprocessed match technique, a preprocessed match with vowels changed to zeros technique, a preprocessed match with vowels removed technique, a preprocessed match with vowels changes to zeros and consonants changed to Soundex technique, a partial attribute match technique, or a commonly-misspelled attribute match technique.

11. A system for filtering a received record associated with at least one record attribute against an entity record, comprising:

a memory including software instructions; and one or more processors configured to execute the software instructions to:

apply a record attribute weight to the at least one record attribute associated with the received record, the at least one record attribute comprising at least one record sub-attribute associated with a corresponding sub-attribute weight, perform at least one matching technique that compares the at least one record sub-attribute of the received record against at least one sub-attribute of the entity record, wherein the at least one matching technique is associated with a corresponding matching technique multiplier, for each of the at least one record sub-attributes that matches an entity record sub-attribute of the entity record, determine a record sub-attribute matching score for the matching record based on the corresponding sub-attribute weight associated with the matching record sub-attribute and the corresponding matching technique multiplier associated with the at least one matching technique, determine a matching score based on (1) a sum of each record sub-attribute score for each matching record sub-attribute of the at least one record attribute and (2) the record attribute weight of the at least one record attribute, and compare the matching score to a threshold to determine whether the received record represents a suspect entity.

12. The system of claim 11, wherein the one or more processors is further configured to execute the software instructions to:

perform a first matching technique to determine whether a first record sub-attribute of the received record matches the at least one entity record sub-attribute in the entity record;

if the first matching technique determines that the first record sub-attribute does not match the at least one entity record sub-attribute, perform a second matching technique to determine whether the first record sub-attribute matches the at least one entity record sub-attribute; and if none of the first or second matching techniques determines that the first record sub-attribute matches the at least one entity record sub-attribute, determine that the first record sub-attribute does not match the at least one entity record attribute in the entity record, and multiplying the corresponding sub-attribute weight of the first record sub-attribute by 0.

13. The system of claim 12, wherein the one or more processors is further configured to execute the software instructions to determine that the first record sub-attribute matches at least one entity record sub-attribute when the first matching technique or the second matching technique determines that characters of the first record sub-attribute are equal to characters of the at least one entity record sub-attribute.

14. The system of claim 11, wherein a sum of the record sub-attribute weights is equal or equivalent to 1.

15. The system of claim 11, wherein the one or more processors is further configured to execute the software instructions to determine the record attribute matching score by multiplying the record attribute weight by the sum of the record sub-attribute scores for each matching record sub-attribute of the at least one record attribute.

16. The system of claim 11, wherein the sum of the record attribute weights applied to the at least one attribute is equal or equivalent to 1.

17. The system of claim 11, wherein the received record comprises at least one name of a participant in a financial transaction.

18. The system of claim 11, wherein the at least one matching technique includes at least one of an exact match technique, a preprocessed match technique, a preprocessed match with vowels changed to zeros technique, a preprocessed match with vowels removed technique, a preprocessed match with vowels changes to zeros and consonants changed to Soundex technique, a partial attribute match technique, or a commonly-misspelled attribute match technique.

19. A system for providing filtered records to identify suspect entities, comprising:

a memory including software instructions; and one or more processors configured to execute the software instructions to:

provide a record to a remote computer system that is configured to:

determine a record attribute associated with the record, apply a record attribute weight to the record attribute, the record attribute comprising at least one record sub-attribute associated with a corresponding sub-attribute weight, perform a matching technique that compares the record sub-attribute against at least one sub-attribute of an entity record, wherein the matching technique is associated with a corresponding matching technique multiplier, for each of the at least one record sub-attributes that matches an entity record sub-attribute of the entity record, determine a record sub-attribute matching score for the matching record based on the corresponding sub-attribute weight associated with the matching record sub-attribute and the corresponding matching technique multiplier associated with the at least one matching technique, determine a matching score based on (1) a sum of each record sub-attribute matching score for each matching record sub-attribute of the record attribute and (2) the record attribute weight of the at least one record attribute, and compare the matching score to a threshold to determine whether the record represents a suspect entity, and provide an indication reflecting the determination whether the record represents the suspect entity, receive the indication whether the record represents the suspect entity from the remote computer system, and present the indication.

20. The system of claim 19, wherein the one or more processors and memory are included in a mobile device.

* * * * *